(12) United States Patent
Golden et al.

(10) Patent No.: US 9,261,300 B2
(45) Date of Patent: Feb. 16, 2016

(54) EXPANSION VALVE CONTROL SYSTEM AND METHOD FOR AIR CONDITIONING APPARATUS

(71) Applicant: Trane International Inc., Piscataway, NJ (US)

(72) Inventors: Hunter Ian Golden, Apex, NC (US); Jason Thomas LeRoy, Tyler, TX (US); Raymond Walter Rite, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 508 days.

(21) Appl. No.: 13/674,918

(22) Filed: Nov. 12, 2012

(65) Prior Publication Data

US 2014/0131599 A1 May 15, 2014

(51) Int. Cl.
*F25B 49/02* (2006.01)
*F25B 41/06* (2006.01)

(52) U.S. Cl.
CPC ............... *F25B 49/02* (2013.01); *F25B 41/062* (2013.01); *F25B 2341/0653* (2013.01); *F25B 2600/2513* (2013.01); *F25B 2700/2106* (2013.01); *F25B 2700/2117* (2013.01); *F25B 2700/21151* (2013.01); *Y02B 30/72* (2013.01)

(58) Field of Classification Search
CPC ................. F25B 41/062; F25B 49/02; F25B 2341/0653; F25B 2600/2513; F25B 2700/21151; F25B 2700/2117; Y02B 30/72
USPC .................................................... 62/222, 225
See application file for complete search history.

(56) References Cited

U.S. PATENT DOCUMENTS

| 5,157,934 A | 10/1992 | Uchida |
| 5,303,562 A * | 4/1994 | Bahel et al. ..................... 62/222 |
| 6,073,459 A | 6/2000 | Iritani |
| 6,148,628 A | 11/2000 | Reason et al. |
| 6,182,456 B1 | 2/2001 | Yamaguchi et al. |
| 6,779,356 B2 | 8/2004 | Lee et al. |
| 6,866,092 B1 * | 3/2005 | Molivadas ............... 165/104.21 |
| 7,213,404 B2 | 5/2007 | Chin et al. |
| 7,617,694 B2 | 11/2009 | Hwang et al. |
| 2008/0028779 A1 | 2/2008 | Song |
| 2009/0031740 A1 * | 2/2009 | Douglas ......................... 62/225 |

FOREIGN PATENT DOCUMENTS

| CN | 101303153 A | 11/2008 |
| CN | 101603751 A | 12/2009 |
| CN | 101806484 A | 8/2010 |
| EP | 2071251 A1 | 6/2009 |
| JP | 6201199 A | 7/1994 |
| WO | 2010106821 A1 | 9/2010 |

OTHER PUBLICATIONS

Chinese Office Action; Application No. 201310554012.4; Jun. 15, 2015; 19 pages.

* cited by examiner

*Primary Examiner* — Marc Norman
(74) *Attorney, Agent, or Firm* — Conley Rose, P.C.; J. Robert Brown, Jr.; Michael J. Schofield

(57) ABSTRACT

A method of controlling an HVAC system electronic expansion valve (EEV) includes determining an optimal EEV position for the HVAC system as a function of a variable related to an ambient environment enthalpy and operating the HVAC system as a function of the optimal EEV position.

8 Claims, 6 Drawing Sheets

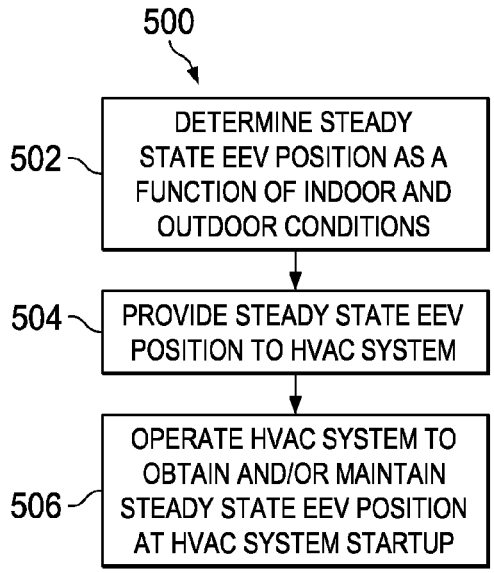
FIG. 5
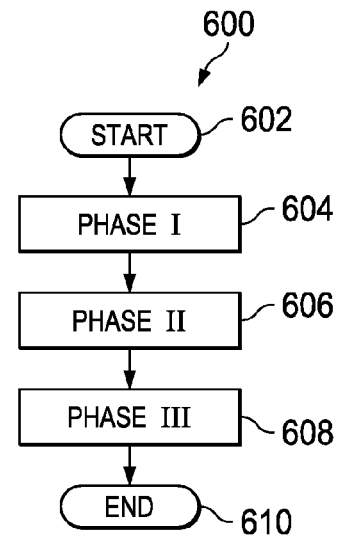
FIG. 6
| TIME SINCE CYCLE ON | STEADY STATE EEV POS. | ET WT. | SH WT. |
|---|---|---|---|
| 0.0 | 1.3 | 0.0 | 0.0 |
| 20 | 1.3 | 0.0 | 0.0 |
| 100 | 1.0 | 0.0 | 0.0 |
| 130 | 1.0 | 0.5 | 0.0 |
| 150 | 1.0 | 1.0 | 1.0 |
PHASE I: rows 1-3
PHASE II: row 4
PHASE III: row 5
FIG. 7

| | TIME SINCE CYCLE ON | STEADY STATE EEV POS. | ET WT. | SH WT. |
|---|---|---|---|---|
| PHASE I | 0.0 | 1.1 | 0.0 | 0.0 |
| | 60 | 1.05 | 0.0 | 0.0 |
| PHASE III | 90 | 1.0 | 0.5 | 0.5 |
| | 105 | 1.0 | 1.0 | 1.0 |

EXPANSION VALVE CONTROL SYSTEM AND METHOD FOR AIR CONDITIONING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some heating, ventilation, and air conditioning systems (HVAC systems) may comprise a thermo-mechanical thermal expansion valve (TXV) that regulates passage of refrigerant through the TXV in response to a temperature sensed by a temperature sensing bulb of the TXV. The bulb of the TXV may be located generally on a compressor suction line near an outlet of an evaporator coil or otherwise be configured to be responsive to variations in temperature of refrigerant line temperatures. When an HVAC system comprising a TXV starts operation, the TXV will operate in response to the actual refrigerant line temperature which leads to a vacillation between overshooting and undershooting a desired superheat value until the system generally reaches a steady state of operation.

In other cases, an HVAC system may comprise a motorized electronic expansion valve (EEV) that may be controlled in a manner selected to reduce the above-described overshooting, undershooting, and/or vacillation. However, some HVAC systems that utilize EEVs utilize a last known good EEV position value as a basis for determining an EEV position for use at startup of the HVAC system. In some cases, the environmental conditions related to the HVAC system may have changed since a previous operation of the HVAC system during which the last known good value was determined, thereby rendering the last known good value a less than optimal basis for determining a startup position for the EEV.

SUMMARY OF THE DISCLOSURE

In some embodiments of the disclosure, a method of controlling an HVAC system electronic expansion valve (EEV) is provided that comprises determining an optimal EEV position for the HVAC system as a function of a variable related to an ambient environment enthalpy and operating the HVAC system as a function of the optimal EEV position.

In other embodiments of the disclosure, a method of controlling an electronic expansion valve (EEV) of an HVAC system is provided that comprises, upon resuming operation of the HVAC system, operating the EEV according to a percentage of a determined steady state EEV position.

In yet other embodiments of the disclosure, a residential HVAC system is disclosed as comprising an electronic expansion valve (EEV) and a controller configured to control a position of the EEV, wherein the controller is configured to control the EEV as a function of a steady state EEV position determined as a function of an ambient environment condition.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 5 is a flow chart of a method of controlling an HVAC system according to an embodiment of the disclosure;

FIG. 6 is a simplified operational flowchart showing an operating method for controlling an EEV;

FIG. 7 is a table of an operating profile for an EEV;

DETAILED DESCRIPTION

Figure 1:
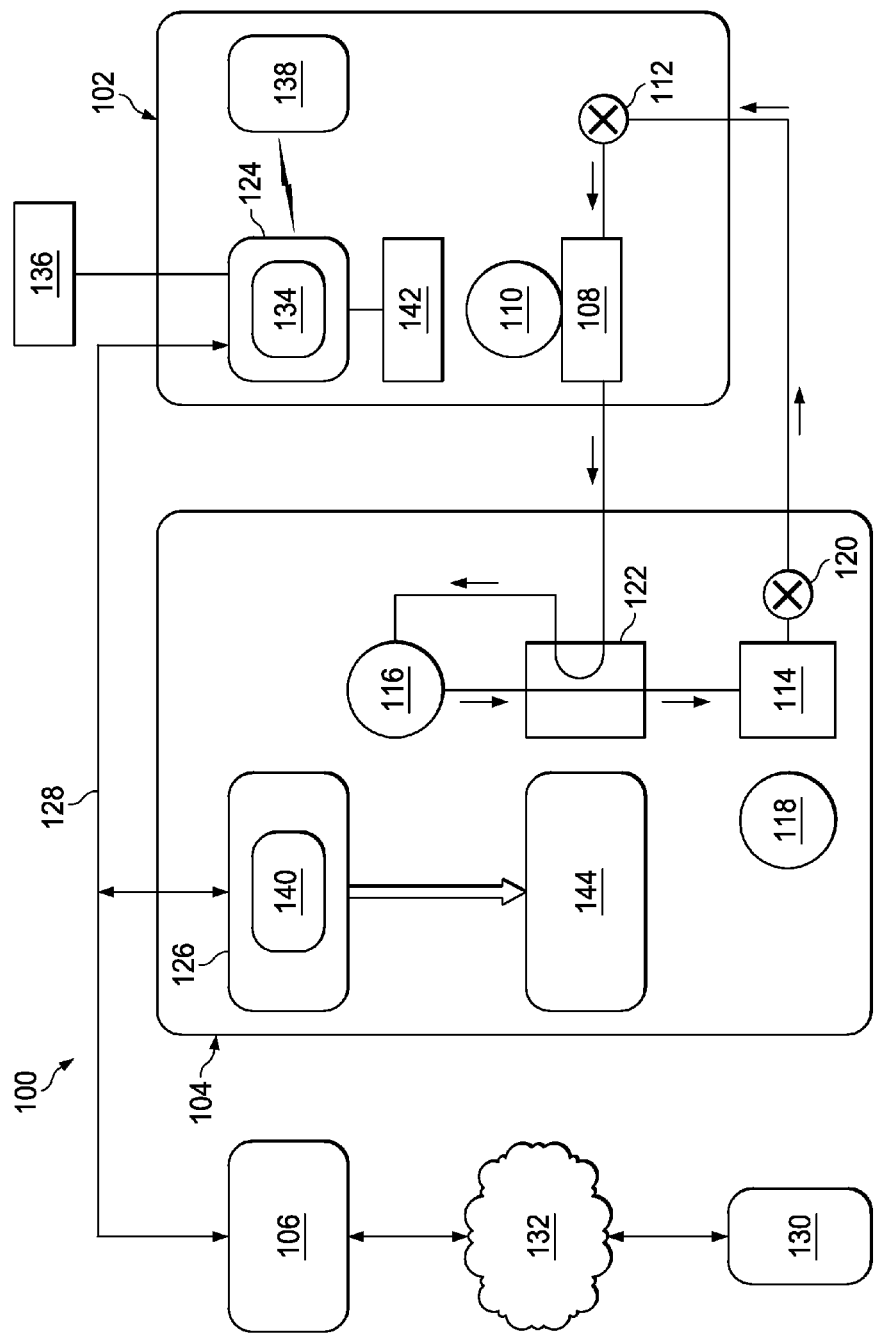
FIG. 1 is a schematic diagram of an HVAC system according to an embodiment of the disclosure.

Some HVAC systems may be operationally tested and assigned an efficiency rating in response to the results of the operational testing. It may be desirable for some HVAC systems to perform in a more optimal manner not only in a steady state of operation but also during cyclical operations of the HVAC system. Some HVAC systems comprising TXVs may fail to provide desirable predictability during cyclical operation of the HVAC system because the TXVs inherently operate according to the temperature sensed by a temperature sensing bulb of the TXV. In some cases, the temperature sensed by the temperature sensing bulb of the TXV may be a function of many random factors of operating the HVAC system in an inconsistent environment. In other words, during cyclical operation of an HVAC system having a TXV, the TXV may restrict refrigerant flow in a first manner under a first set of operational circumstances while the same TXV of the same HVAC system may restrict refrigerant flow in a second manner under a second set of operational circumstances. As such, there is a need for an HVAC system having an expansion valve that provides more efficient and/or more predictable operation of the HVAC system during cyclical operation of the HVAC system regardless of initial operational circumstances. In some embodiments, this disclosure may provide a so-called "EEV cycling profile" or "profile" that dictates operation of an EEV in a prescribed manner to ensure favorable $C_D$ values (where $C_D$ is the commonly known cyclic loss coefficient used in computation of a Seasonal Energy Efficiency Rating or SEER) and high HVAC system cycling efficiency.

Some HVAC systems have been provided with electronic expansion valves (EEVs) and/or motor controlled expansion valves, in an effort to provide more efficient and/or more predictable operation of the HVAC systems. For example, U.S. Patent Application Publication No. US 2009/0031740 A1 (hereinafter referred to as "Pub. No. '740", which is hereby incorporated by reference in its entirety, discloses several HVAC systems 10, 50, and 70 of FIGS. 1, 2, and 3, respectively, as comprising electronic motorized expansion valves 36, 36a, 36b. Pub. No. '740 discloses in great detail the composition and structure of the HVAC systems 10, 50, and 70 and further discloses methods of controlling the electronic motorized expansion valves 36, 36a, 36b. Particularly, the operation and control of electronic motorized expansion valves 36, 36a, 36b is disclosed at paragraphs [0037]-[0040] and FIGS. 5 and 7 as comprising various stages and methods of controlling the electronic motorized expansion valves 36, 36a, 36b (hereinafter generally collectively referred to as EEVs).

Pub. No. '740 discloses that the EEVs may be controlled according to a predefined valve movement profile for a period of time at startup of the HVAC systems (see step 98 of FIG. 5) and thereafter controlled according to a feedback control mode (see step 100 of FIG. 5) during normal operation of the HVAC system. FIG. 7 of Pub. No. '740 discloses a table of values of time in seconds and the position of the EEVs as a percent open relative to an initial starting position of the EEVs. Accordingly, Pub. No. '740 discloses that while the EEVs may be controlled according to a predefined valve movement profile for a period of time at startup of the HVAC system, a feedback based control algorithm may be gradually phased in over time to control the position of the EEVs, thereby gradually replacing the influence of the predefined valve movement profile. This disclosure provides systems and methods of controlling and/or implementing EEVs such as 36, 36a, 36b.

Further, U.S. Patent Application Publication No. US 2012/0080179 A1 (hereinafter referred to as "Pub. No. '179", which is hereby incorporated by reference in its entirety, discloses that EEVs may be controlled to have positions and/or values at startup of the HVAC system as a function of last known good evaporator temperature values, or in other words, as a function of the evaporator temperature as measured during a recent operation of the HVAC system in a substantially steady state. In some embodiments of Pub. No. '179, the operation of the EEV is controlled in several phases. In a first phase, the position of the EEV is controlled to a position that is more open as compared to the last known good EEV position value. For example, in some embodiments, the EEV may be generated by applying a multiplication factor, such as 1.3, so that an EEV is opened to a position 130% of the value of the last known good EEV position value. Pub. No. '179 further discloses that during operation of the EEV in a second phase, the initial startup values for the EEV may be gradually mixed with actual feedback values of the HVAC system, such as evaporator temperature, so that a weighted percentage of control of the EEV during the second phase is attributable to the startup position while another weighted percentage of control of the EEV during the second phase is attributable to actual feedback values. In a third phase of operation of the EEV, the startup position and/or value for the EEV may no longer be used and the EEV may be controlled as a function of only the actual HVAC system feedback. The multiplication factors, timing, and weighted percent values may vary amongst different embodiments, but collectively, those control values may be referred to as an EEV control profile. In some cases, the EEV control profile may be selected to improve efficiency and/or protect a compressor from receiving excessive amounts of liquid refrigerant while still quickly achieving steady state operation and/or a desired superheat value.

In some HVAC systems described above, an expansion valve, whether a TXV or EEV may be caused to operate in a manner that is less than optimal for preventing overshooting, undershooting, and/or vacillation of superheat values when the HVAC system is started up. In some cases, the startup value for the expansion valve may be a function of an actual refrigerant line temperature at startup (i.e. TXVs) and/or a function of a last known good and/or last known steady state value (i.e. EEVs). Accordingly, there is a need for a system and method of controlling an EEV in a predictable manner during cyclical operations of an HVAC system to increase an actual and/or a tested efficiency of the HVAC system. Most generally, this disclosure may provide systems and methods for controlling an EEV according to startup value and/or startup position that is responsive to and/or as a function of one or more of indoor ambient conditions, outdoor ambient conditions, and/or a system operation capacity (i.e. compressor capacity), for example, rather than solely as a function of a last known good value.

Referring now to FIG. 1, a simplified schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, and a reversing valve 122. Outdoor heat exchanger 114 is a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a microchannel heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating or rotary type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may comprise a temperature sensor and may further be configured to control heating and/or cooling of zones associated with the HVAC system 100. In some embodiments, the system controller 106 may be configured as a thermostat for controlling supply of conditioned air to zones associated with the HVAC system. In some embodiments, the system controller 106 may further comprise pressure sensors, humidity sensors, and/or any other suitable sensor for sensing, monitoring, and/or recording indoor and outdoor ambient environment conditions and/or indoor and outdoor ambient environment enthalpies.

In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or other device 130 via a communication network 132. In some embodiments, the communication network 132 may comprise a telephone network and the other device 130 may comprise a telephone. In some embodiments, the communication network 132 may comprise the Internet and the other device 130 may comprise a so-called smartphone and/or other Internet enabled mobile telecommunication device.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
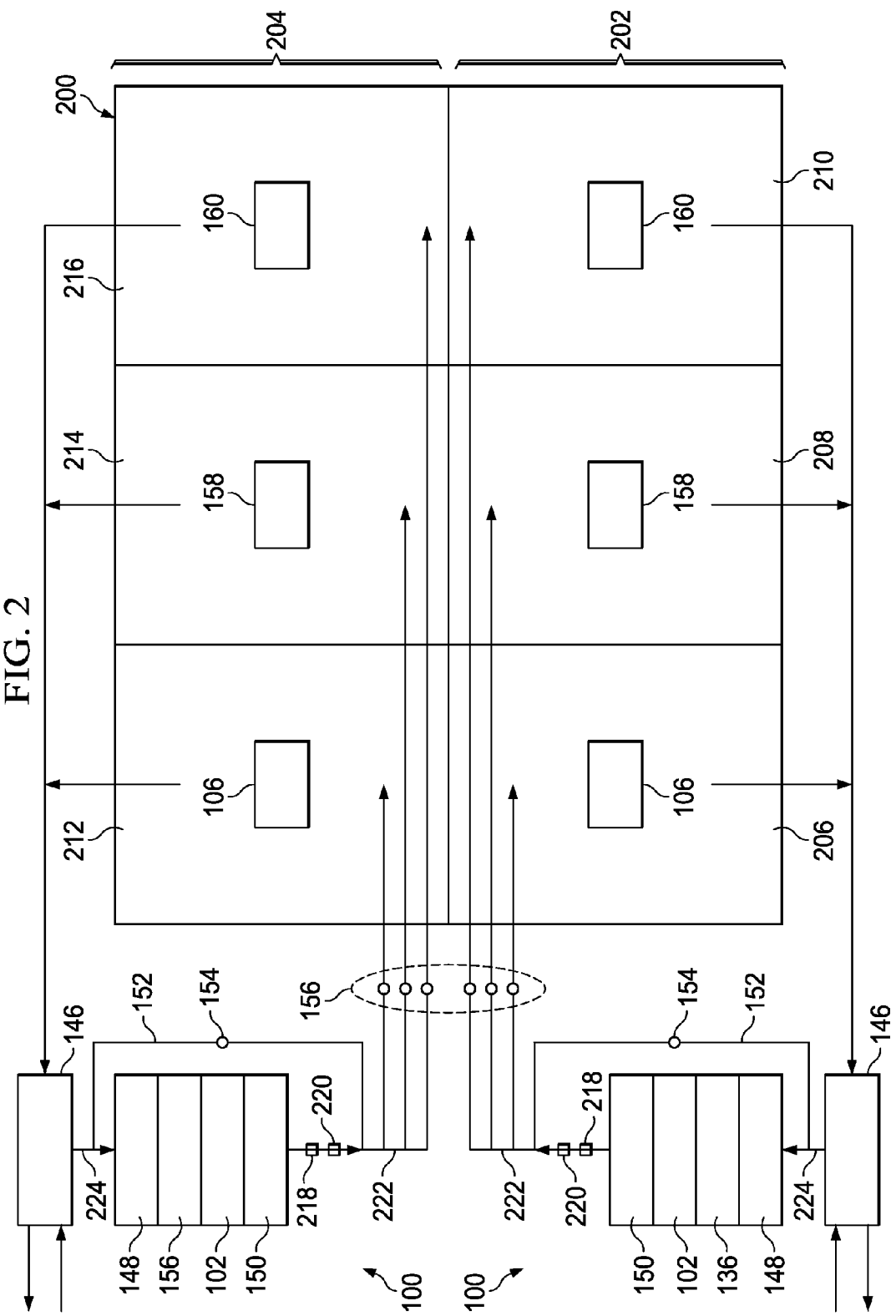
FIG. 2 is a schematic diagram of the air circulation paths of the HVAC system of FIG. 1.

Referring now to FIG. 2, a simplified schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210 while the upper floor 204 comprises zones 212, 214, and 216. The HVAC system 100 associated with the lower floor 202 is configured to circulate and/or condition air of lower zones 206, 208, and 210 while the HVAC system 100 associated with the upper floor 204 is configured to circulate and/or condition air of upper zones 212, 214, and 216.

In addition to the components of HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter media selected to catch and/or retain relatively large particulate matter prior to air exiting the prefilter 148 and entering the air cleaner 136. The humidifier 150 may be operated to adjust a humidity of the circulating air. The bypass duct 152 may be utilized to regulate air pressures within the ducts that form the circulating air flow paths. In some embodiments, air flow through the bypass duct 152 may be regulated by a bypass damper 154 while air flow delivered to the zones 206, 208, 210, 212, 214, and 216 may be regulated by zone dampers 156.

Still further, each HVAC system 100 may further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may communicate with the system controller 106 to provide temperature, humidity, and/or other environmental feedback regarding the zone in which the zone sensor 160 is located.

Each HVAC system 100 may further comprise a pressure sensor 218 and a temperature sensor 220. The pressure sensor 218 may provide a pressure measurement of the supply air within a supply header 222. The temperature sensor 220 may provide a temperature measurement of the supply air within the supply header 222. The pressure sensor 218 and the temperature sensor 220 may provide information to the system controller 106 and the indoor controller 124 for purposes of managing excess air conditions. Each HVAC system 100 may further comprise a return input 224 into which airflow exiting bypass duct 152 may be fed.

While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby not requiring air ducts to route the air conditioned by the indoor units 102.

Still referring to FIG. 2, the system controllers 106 may be configured for bidirectional communication with each other and may further be configured so that a user may, using any of the system controllers 106, monitor and/or control any of the HVAC system 100 components regardless of which zones the components may be associated. Further, each system controller 106, each zone thermostat 158, and each zone sensor 160 may comprise a humidity sensor. As such, it will be appreciated that structure 200 is equipped with a plurality of humidity sensors in a plurality of different locations. In some embodiments, a user may effectively select which of the plurality of humidity sensors is used to control operation of one or more of the HVAC systems 100. In some embodiments, the humidity may be represented as a relative humidity percentage value.

Figure 3:
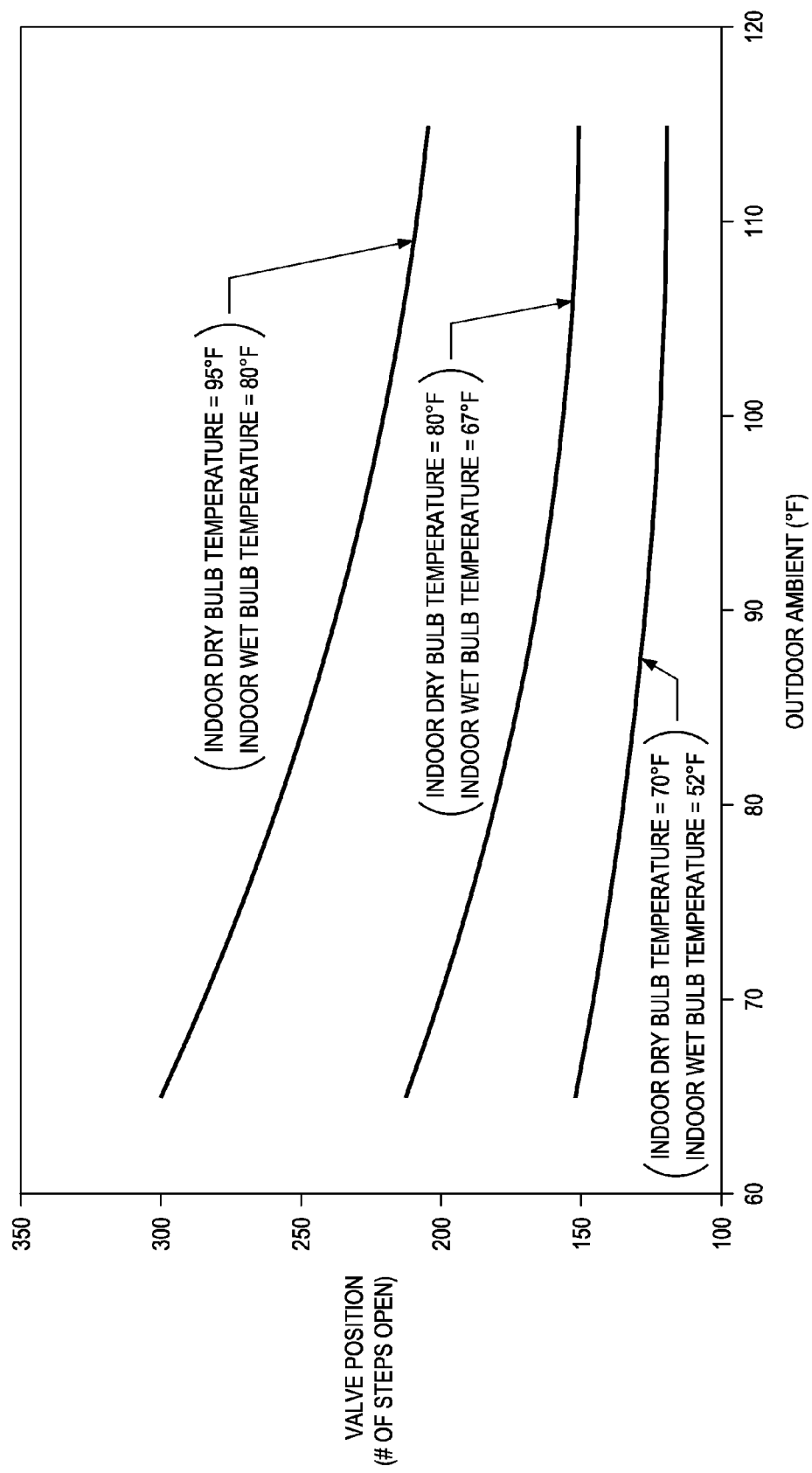
FIG. 3 is a chart showing determined steady state EEV position relative to outdoor ambient temperature for a plurality of indoor ambient environment conditions (enthalpies)

Referring now to FIG. 3, a chart showing steady state EEV position versus outdoor ambient temperature is shown as a function of indoor enthalpy, where the EEV positions are representative of the appropriate steady state operation position for a particularly configured HVAC system starting up with indoor and outdoor conditions specified in the chart. The curves are each representative of different constant indoor enthalpies. Particularly, the upper curve represents indoor conditions of indoor dry bulb temperature of 95° F. and indoor wet bulb temperature of 80° F., the middle curve represents indoor conditions of indoor dry bulb temperature of 80° F. and indoor wet bulb temperature of 67° F., and the lower curve represents indoor conditions of indoor dry bulb temperature of 70° F. and indoor wet bulb temperature of 52° F. In other words, the chart shows what EEV positions are expected to be the ideal positions for a particular system under particular indoor and outdoor environmental conditions. More specifically, the chart of FIG. 3 shows three second order polynomial curves representative of indoor enthalpy (i.e. as a function of indoor dry bulb temperature and indoor wet bulb temperature, or in other words, as a function of indoor temperature and indoor humidity) along an x-axis representative of outdoor temperature and along a y-axis representative of steady state EEV position. The chart of FIG. 3 may be utilized for cooling applications. While the chart of FIG. 3 only refers to the outdoor temperature, alternative embodiments, such as embodiments for use in heating applications, may additionally take into consideration outdoor enthalpy. In some cases, the chart of FIG. 3 may be determined experimentally while in other cases the chart of FIG. 3 may be computed as a function of experimentally verified thermodynamic system modeling techniques. Regardless the genesis of the chart of FIG. 3, the relationships determined and/or presented may be made available to an HVAC system controller, such as, but not limited to, system controller 106 so that HVAC system 100 may operate at startup as a function of the steady state EEV positions represented in the chart of FIG. 3.

The values of the chart of FIG. 3 are specific to a particular HVAC system configuration and are further specific to a particular speed of operation of the specific HVAC system. For example, when an HVAC system 100 is a modulating system so that a compressor and/or other components may be selectively controlled to effectively operate at different tonnages, BTU/h capacities, speeds, and/or to incorporate more or fewer heat sources and/or heat sinks (i.e., hydronic systems, geothermal loops, etc.), this disclosure contemplates determining different relationships between EEV position and indoor and/or outdoor conditions so that the variations in an HVAC system capacity are accounted for. For example, if an HVAC system is configured to operate selectively at four different speeds, this disclosure contemplates providing the HVAC system with four complementary sets of data, charts, and/or steady state EEV position relationships so that no matter what speed the HVAC system is started up at or operated at, the HVAC system is equipped to control the EEV to an appropriate steady state value as a function of indoor and outdoor conditions specific to the selected HVAC system operating capacity. Accordingly, in some embodiments, the startup position of the EEV controller may be considered to be selected as a function of indoor enthalpy, outdoor enthalpy, and HVAC system startup capacity. Similarly, because the relationships of FIG. 3 are indicated as a numeric position value of the EEV rather than indicative of cross-sectional flow area through an EEV, generalized pressure and/or flow restriction characteristics of an EEV, and/or other generalized operational characteristics of an EEV, the chart of FIG. 3 is considered appropriate for a particular EEV rather than universally applicable to all EEVs. In some embodiments, various EEVs may be modeled and/or their specifications studied and generalized so that an HVAC system 100 may comprise data for a variety of different EEVs thereby allowing easy selection of appropriate EEV position relationships additionally as a function of a designated EEV type or model. Similarly, an HVAC system may be provided with data for one or more compressors and/or compressor capacity operation schemes.

In some embodiments, such as for a heat pump HVAC system, the relationships may need to be determined for each of a cooling mode of operation and a heating mode of operation. As described above, some environmental parameters that affect enthalpy may be selectively deemphasized so that barometric pressure and/or outdoor humidity are not utilized. In such cases, the relationships determined for establishing steady state EEV position for a heat pump cooling mode may follow that describe above so that indoor temperature, indoor humidity, and outdoor temperature are utilized where the indoor parameters are associated with the evaporator and the outdoor parameters are associated with the condenser. However, for the same heat pump in a heating mode, the steady state EEV position relationships may be determined as a function of indoor temperature, outdoor humidity, and outdoor temperature (simplified to outdoor enthalpy) so that the indoor parameters are associated with the condenser and the outdoor parameters are associated with the evaporator.

In some embodiments, the HVAC system controller 106 and/or other HVAC system 100 components may be configured to calculate the above-described relationships in real-time or near real-time so that the HVAC system 100 is calculating steady state EEV positions during field operation with the positions being based on previously determined thermodynamic relationships between steady state EEV position and indoor and outdoor conditions obtained through experimentation and/or thermodynamic modeling. Further, while a particular HVAC system 100 configuration may yield steady state EEV position relationships that may be generalized as second degree polynomial equations as show in FIG. 3, other curve fitting techniques may be utilized. In some embodiments, the general shape of a curve associated with a particular set of indoor and outdoor conditions may be merely shifted up or down along the EEV position axis (i.e. the y-axis of FIG. 3) to roughly accommodate changes in HVAC system operating capacity and/or HVAC system startup capacity so that fewer experiments, fewer thermodynamic simulations, less electronic data storage memory space, and/or fewer calculations are required to approach achieving a result similar to a result that is a function of providing data specific to the other capacities.

Figure 4:
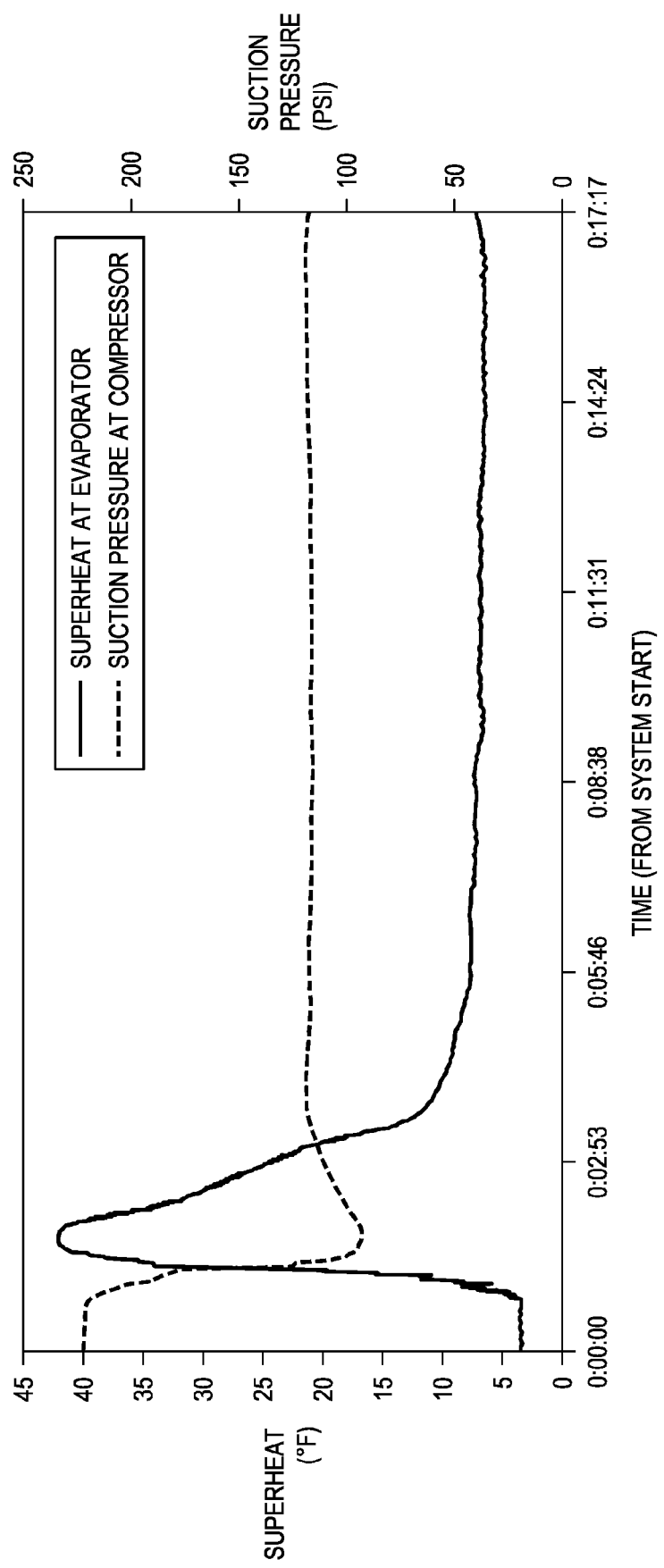
FIG. 4 is a chart showing transient superheat and suction pressure values achieved by operating an HVAC system according to a fixed EEV position of FIG. 3.

Referring now to FIG. 4, a chart showing the result of operating an HVAC system according to an EEV startup position selected as function of the relationships of FIG. 3 is shown. Specifically, the chart of FIG. 4 shows superheat values (a difference between the gas temperature and the saturated liquid temperature or evaporator temperature) and suction pressure values plotted over the course of initial HVAC system startup (generally at time=0 to about time=200 seconds) and through operation of the HVAC system operating at near steady state (generally at about time=200 seconds to about time=1,050 seconds). The chart of FIG. 4 demonstrates that steady state superheat values are quickly achieved and without the great vacillations that may otherwise occur if significant use of HVAC system operation feedback were used instead of a constant startup value and/or a startup value selected as a function of indoor and outdoor conditions.

Referring now to FIG. 5, a flowchart of a method 500 of controlling an EEV is shown. In some embodiments, the method 500 may begin at block 502 by determining an appropriate steady state EEV position as a function of both indoor and outdoor conditions. In some embodiments, the indoor and outdoor conditions may comprise barometric pressure, temperature, humidity, and/or any other factor associated with affecting indoor ambient environment enthalpy and outdoor ambient environment enthalpy. The method 500 may progress to block 504 and may supply the steady state EEV position to an HVAC system. The method 500 may progress to block 506 and may control the EEV to obtain and/or maintain the steady state EEV position. In some embodiments, the EEV may obtain and/or be caused to maintain the steady state EEV position during a startup of the HVAC system (i.e. compressor startup) and the steady state EEV position may be maintained until the HVAC system is generally operating in a steady state and/or until incorporating HVAC system operating parameter feedback into the control of the EEV position would not significantly destabilize a superheat value. In some embodiments, as described below, the HVAC system may not obtain or maintain the steady state EEV position, but rather, may control the EEV as a function of the steady state EEV position.

Referring now to FIG. 6, a simplified operational flowchart illustrates how EEVs (such as, for example, but not limited to, motorized expansion valves 36, 36a, 36b of HVAC systems 10, 50, and 70 of FIGS. 1, 2, and 3 of Pub. No. '740) may be controlled to achieve a higher HVAC system cyclical operating efficiency. Most generally, the EEVs may be controlled according to a method 600. Method 600 starts at block 602 when the HVAC system may select a type of EEV, an HVAC system capacity, determine environmental conditions related to indoor and outdoor enthalpy, and determine an appropriate EEV steady state value for the above-described variables. Method 600 may progress from block 602 to Phase I operation at block 604.

Phase I operation generally comprises controlling the position of the EEVs as a multiplier of the steady state EEV position previously determined at block 602. In many embodiments, the multiplier may result in opening the EEVs to an open position greater than the steady state EEV position. For example, in some embodiments, Phase I may comprise multiplying the steady state EEV position by a weight factor of, for example, but not limited to, 1.3, whereby if the steady state EEV position was determined to be 100, then the initial opening would be at a position of 130 which allows more refrigerant mass flow through the EEVs as compared to the mass flow through the EEVs that may result if the EEVs were opened to the steady state EEV position. In other embodiments, at some point during control of the EEVs according to Phase I, the steady state EEV position may be multiplied by a weight factor ranging from about 1.0 up to about 5.0. It will be understood that while weight factors greater than 1.0 may cause varying degrees of flooding a compressor with liquid refrigerant (when all other variables of operation are substantially held constant), this condition may be limited to a time of occurrence of up to about 5 minutes or less in order to prevent possible damage to the compressor attributable to liquid refrigerant entering the compressor. Flooding a compressor may be generally defined as a condition where liquid refrigerant enters a compressor because the refrigerant gas temperature (GT) is substantially similar in value to the saturated liquid temperature or evaporator temperature (ET). A difference between the gas temperature (GT) and the saturated liquid temperature or evaporator temperature (ET) may be referred to as superheat (SH) (i.e., SH=GT−ET). In some embodiments, flooding the compressor with refrigerant may provide a higher cyclical operating efficiency and/or reduced $C_D$ value. In some embodiments, allowing more refrigerant mass flow through the EEVs at startup may increase a rate of heat transfer and associated suction pressure, thereby reducing cyclic losses prior to the HVAC system having operated long enough to approach operation at steady state.

In other embodiments, Phase I operation may comprise any combination of opening the EEVs to values less than, equal to, and/or greater than the steady state EEV position so long as at some point during operation of Phase I (absent discontinuing operation of the HVAC system prior to substantially reaching steady state) the EEVs are controlled as a function of the steady state EEV position. Another requirement of operation of Phase I is that at some time during operation of Phase I, the EEVs are controlled substantially without respect to current and/or last recorded evaporator temperatures (ET) and/or current and/or last recorded gas temperatures (GT) and/or current and/or last recorded superheat values (SH). After operation in Phase I, the method 600 continues to operation in Phase II at block 606.

Phase II operation generally comprises incorporating use of measured ET as a component in controlling the position of EEVs. Most generally, the measured ET may be compared to a last good ET and multiplied by an ET weight factor. In some embodiments, the time at which Phase II operation generally begins may be associated with an experimentally determined time that an ET value of a particular HVAC system becomes a relatively reliable and/or stable indicator of a state of operation of the HVAC system. In some embodiments, Phase II may comprise multiplying the last good ET by a weight factor of zero to a factor of up to about 2.0. While the last good ET may be multiplied against a variety of weight factors in Phase II, at some point during control of the EEVs according to Phase II (absent discontinuing operation of the HVAC system prior to substantially reaching steady state), the last recorded ET must be multiplied by a positive or negative value weight factor. Phase II operation may continue until the method 600 progresses to Phase III operation at block 608.

Most generally, Phase III operation comprises incorporating use of measured ET and measured GT as components in controlling the position of EEVs. In some embodiments, the measured ET may be subtracted from the measured GT to determine a measured SH. Most generally, the measured SH may be compared to a last recorded SH and multiplied by a SH weight factor. Additionally, the measured SH may be compared to a SH setpoint and multiplied by a SH weight factor. In some embodiments, the time at which Phase III operation generally begins may be associated with an experimentally determined time that a GT value (and consequently a SH value) of a particular HVAC system becomes a relatively reliable and/or stable indicator of a state of operation of the HVAC system. In some embodiments, Phase III may comprise multiplying the last recorded SH by a weight factor of zero to a factor of about 1.0. While the last recorded SH may be multiplied against a variety of weight factors in Phase III, at some point during control of the EEVs according to Phase III (absent discontinuing operation of the HVAC system prior to substantially reaching steady state), the last recorded SH must be multiplied by a positive value weight factor. Phase III operation may continue until the method 600 stops at block 610. In some embodiments, Phase III operation may be stopped in response to the HVAC system meeting a demand for conditioning a space to a requested temperature (i.e., meeting a temperature requested by a thermostat). In some embodiments, Phase III operation may be stopped because the SH feedback control is in a full control mode (as described in Pub. No. '740) and the method 600 is exhausted. The method 600 may be initiated again when the temperature of the space deviates enough from the requested temperature to cause the HVAC system to cycle on again.

Referring now to FIG. 7, an example operating profile is shown. FIG. 7 is a table that comprises a column indicative of time since a cycle is deemed ON according to a control unit, a column of steady state EEV position weight factors for use in multiplying against a determined steady state EEV position, a column of ET weight factors, and a column of SH weight factors. The profile of FIG. 7 shows that from time=0 to time=20, the EEVs would be controlled to have an EEV position of 130% of the steady state EEV position. Next, FIG. 7 shows that from time=20 to time=100, the EEV position is controlled to gradually change from 130% of the steady state EEV position to 100% of the steady state EEV position. Operation between time=0 to time=100 may be considered a Phase I operation since ET and SH are ignored (associated with weight factors of 0.0).

Next, FIG. 7 shows that from time=100 to time=130, the steady state EEV position weight factor remains at 1.0 while the ET weight factor is gradually increased from 0 to 0.5. As such, from time=100 to time=130, the measured ET gradually increasingly influences the position of EEVs up to a weight factor of 0.5. During this time period, the SH weight factor remains 0. In some embodiments, because the measured ET is utilized while the measured GT and/or the measured SH are not utilized in setting the position of the EEVs, the period of time from time=100 to time=130 may be referred to as a Phase II operation.

Next, FIG. 7 shows that from time=130 to time=150, the steady state EEV position weight factor remains at 1.0 while the ET weight factor is gradually increased from 0.5 to 1.0 and the SH weight factor is gradually increased from 0 to 1.0. As such, from time=130 to time=150, the measured ET gradually increasingly influences the position of EEVs up to a weight factor of 1.0 while the measured SH gradually increasingly increases in influencing the position of the EEVs up to a weight factor of 1.0. In some embodiments, because the measured ET is utilized in addition to the measured GT and/or the measured SH to set the position of the EEVs, the period of time from time=130 to time=150 may be referred to as a Phase III operation that reaches total feedback control at time=150.

In some embodiments, the time required to accomplish total feedback control, where each of the weight factors of steady state EEV position, ET, and SH are equal to 1.0, may require up to about 5 minutes or more for each. Further, it will be appreciated that the rate at which one or more of the rates at which an EEV position weight factor is decreased or increased, the rate at which an ET weight factor is decreased or increased, and the rate at which a SH weight factor is increased or decreased may generally be increased or decreased as the tonnage of a substantially similar HVAC system is changed or as any other HVAC system design factor affecting the time required to approach and/or reach steady state operation is changed. In other words, because HVAC systems of different tonnage and/or capacity tend to circulate refrigerant throughout the refrigeration circuit at different rates, different HVAC systems may comparatively tend to reach steady state and/or near steady state operation at different times.

Figures 8, 9:
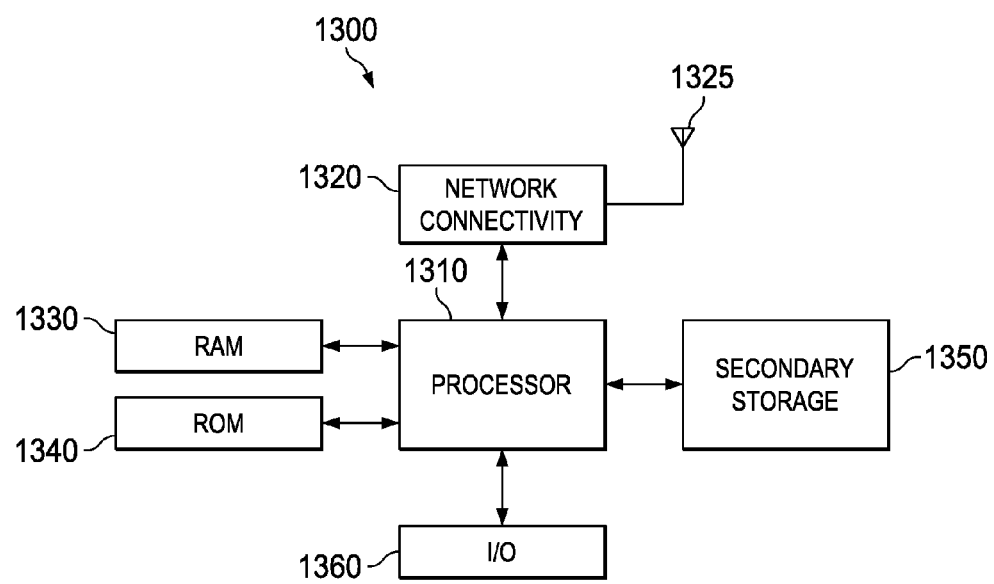
FIG. 8 is a table of another operating profile for an EEV.
FIG. 9 is a simplified representation of a general-purpose processor (e.g., electronic controller or computer) system suitable for implementing the embodiments of the disclosure.

Referring now to FIG. 8 another example profile is shown. FIG. 8 is a table that comprises a column indicative of time since a cycle is deemed ON according to a control unit (such as, but not limited to, control units 114 and 214), a column of steady state EEV position weight factors for use in multiplying against a steady state EEV position, a column of ET weight factors, and a column of SH weight factors. The operating profile of FIG. 8 shows that from time=0 to time=60, the EEVs would be controlled to gradually change from an EEV position of 110% of the steady state EEV position to 105% of the steady state EEV position. Operation between time=0 to time=60 may be considered a Phase I operation since ET and SH are ignored (associated with weight factors of 0.0).

Next, FIG. 8 shows that from time=60 to time=90, the steady state EEV position weight factor gradually changes from an EEV position of 105% of the steady state EEV position to 100% of the steady state EEV position while the ET weight factor gradually changes from 0 to 0.5. As such, from time=60 to time=90, the measured ET gradually increasingly influences the position of EEVs up to a weight factor of 0.5. During this time period, the SH weight factor also gradually changes from 0 to 0.5. As such, from time=60 to time=90, the measured SH gradually increasingly influences the position of EEVs up to a weight factor of 0.5. In this embodiment, because the measured ET is not utilized to set the position of the EEVs to the exclusion of the measured GT and/or the measured SH, the period of time from time=60 to time=90 may be referred to as part of a Phase III operation. In other words, because the measured ET and the measured SH are utilized simultaneously immediately following Phase I operation, the profile of FIG. 8 may not comprise a period of Phase II operation. From time=90 to time=105, the steady state EEV position weight factor remains unchanged while each of the ET and SH weight factors gradually increase from 0.5 to 1.0. Operation from time=90 to time=105 may also be referred to as Phase III operation resulting in total feedback control at time=105.

It will be appreciated that the time values and the various weight factors provided, for example in FIGS. 7 and 8, may be determined experimentally through actual operation of HVAC systems and/or through simulated operation of HVAC systems. In some embodiments, the steady state of an HVAC system may be determined by first operating the HVAC system in an uninterrupted manner for at least about 60 minutes, after which duration, it is assumed that no further substantial gains in performance will be obtained by simply continuing operation of the HVAC system. While the HVAC system is operating in the steady state, EEV position, ET value, GT value, and SH value may be recorded. Thereafter, the HVAC system may be stopped and allowed to return to a pre-operation state where ET value, GT value, SH value, and other HVAC system temperatures and pressures are substantially equalized in response to prolonged exposure to the ambient environment. The HVAC system may thereafter be restarted and the EEV position, ET value, GT value, and SH value may be monitored to determine at what elapsed times steady state operation is first achieved (i.e., when each of the EEV position, ET value, GT value, and SH value reach the previously measured steady state values). In some cases, the ET value may reach an acceptable value in advance of the GT value and/or SH value. Accordingly, the time experimentally determined for ET weight factors to reasonably relate to the correct steady state ET value may be used as the time at which ET values may begin to be weighted in as a factor of controlling EEV position. Similarly, the time experimentally determined for GT value and/or SH weight factor to reasonably relate to the steady state GT value and/or steady state SH value may be used as the time at which GT value and/or steady state SH value may begin to be weighted in as a factor of controlling EEV position. Further, in some embodiments, the weights assigned to EEV position may be based in part upon experimental determination of correct EEV position during steady state operation and/or a attaining the correct operating suction pressure of the HVAC system without overshooting and going below the steady state operating point. By gradually approaching the steady state suction pressure during startup, and not going below the steady state suction pressure, the cyclic efficiency may be increased.

The above-described systems and methods of controlling an EEV may provide consistent cyclical operation of an HVAC system so that the HVAC system may operate more efficiently and/or may receive a higher efficiency rating due to a decreased $C_D$ value. Further, the above-described consistent operation may be determined using the above-described method and/or algorithm and may be implemented though software which controls EEV functionality and/or operation. Still further, while the above described systems and methods are primarily discussed as being configured for determining a startup EEV position as a function of indoor conditions (i.e. indoor enthalpy), outdoor conditions (i.e. outdoor enthalpy), HVAC system capacity, and/or EEV type (i.e. model), the same steady state EEV values may be utilized by an HVAC system well beyond startup of the HVAC system and, in some cases, may be utilized in an EEV control profile in addition and/or to the exclusion of actual HVAC system operating condition feedback information. In some embodiments, the steady state EEV position may be referred to as an optimal EEV position. In alternative embodiments, the EEV position determined may be determined as an optimal EEV position while not necessarily being a steady state EEV position, nonetheless, the determined optimal EEV position may still be determined as a function of indoor and/or outdoor conditions.

FIG. 9 illustrates a typical, general-purpose processor (e.g., electronic controller or computer) system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320.

Some or all of the I/O devices 1360 may be substantially similar to various components disclosed herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of controlling an electronic expansion valve (EEV) of an HVAC system, comprising:
    determining a steady state EEV position as a function of indoor enthalpy and outdoor ambient temperature;
    discontinuing operation of the HVAC system;
    upon resuming operation of the HVAC system, operating the EEV according to a percentage of the determined steady state EEV position;
    wherein in response to operating the EEV at a higher percentage than the determined steady state EEV position, decreasing the percentage after a predetermined time period has elapsed; and
    wherein in response to operating the EEV at a lower percentage than the determined steady state EEV position, increasing the percentage after a predetermined time period has elapsed.

2. The method of claim 1, wherein the determined steady state EEV position is different than a last known good steady state EEV position that was determined as a function of controlling the HVAC system as a function of a superheat feedback of the HVAC system.

3. The method of claim 1, wherein the percentage is greater or less than 100%.

4. The method of claim 1, wherein the operating the EEV as a function of the determined steady state EEV position is accomplished without consideration of a previously recorded evaporator temperature, a previously recorded gas temperature, and a previously recorded superheat.

5. The method of claim 1, wherein the percentage is changed over time until the percentage reaches 100%.

6. The method of claim 1, further comprising:
    after operating the EEV according to a percentage of a determined steady state EEV position, incorporating a measured evaporator temperature as a component in operating the EEV.

7. The method of claim 6, further comprising:
    after operating the EEV according to a percentage of a determined steady state EEV position and the instantaneous measured evaporator temperature, incorporating a measured evaporator temperature and a measured gas temperature as components in operating the EEV.

8. A method of controlling an electronic expansion valve (EEV) of an HVAC system, comprising:
    upon resuming operation of the HVAC system, operating the EEV according to a percentage of a determined steady state EEV position;
    wherein in response to operating the EEV at a higher percentage than the determined steady state EEV position, decreasing the percentage after a predetermined time period has elapsed, wherein a rate of decrease of the percentage is selected in response to a design characteristic of the HVAC system that affects the time required by the HVAC system to approach steady state operation;
    wherein in response to operating the EEV at a lower percentage than the determined steady state EEV position, increasing the percentage after a predetermined time period has elapsed, wherein a rate of decrease of the percentage is selected in response to a design characteristic of the HVAC system that affects the time required by the HVAC system to approach steady state operation; and
    adjusting the percentage over time until the percentage reaches 100%.

* * * * *